United States Patent [19]

Kitamura et al.

[11] Patent Number: 5,195,233
[45] Date of Patent: Mar. 23, 1993

[54] METHOD OF PRODUCING MAGNETIC HEAD STRUCTURE

[75] Inventors: Mikio Kitamura; Shingo Makino; Yoshio Takeshima, all of Shiga, Japan

[73] Assignee: NEC Corporation, Tokyo, Japan

[21] Appl. No.: 726,186

[22] Filed: Jul. 5, 1991

[30] Foreign Application Priority Data

Jul. 5, 1990 [JP] Japan .................................. 2-178595
Nov. 30, 1990 [JP] Japan .................................. 2-339892

[51] Int. Cl.$^5$ .............................................. G11B 5/42
[52] U.S. Cl. .................................. 29/603; 360/122; 360/127
[58] Field of Search .................. 29/603; 360/119-121, 360/122, 125-127

[56] References Cited

U.S. PATENT DOCUMENTS

| | | | |
|---|---|---|---|
| 3,789,505 | 2/1974 | Huntt | 29/603 |
| 4,251,910 | 2/1981 | Griffith | 29/603 |
| 4,890,379 | 1/1990 | Yohda et al. | 29/603 |

Primary Examiner—Carl E. Hall
Attorney, Agent, or Firm—Burns, Doane, Swecker & Mathis

[57] ABSTRACT

The head is made up of a first core block having a first core, and a second core block having a second core and a coil wound therearound. The core blocks each has a pair of slider blocks which hold the first or second core between the bonding surfaces thereof. The first core forms part of the bonding surface of either one of the pair of slider blocks or is buried in the bonding surface of either one of the slider blocks, so that the bonding surfaces are flat.

5 Claims, 12 Drawing Sheets

METHOD OF PRODUCING MAGNETIC HEAD STRUCTURE

BACKGROUND OF THE INVENTION

The present invention relates to a magnetic head and more particularly, to the structure of a magnetic head for use with a hard disk drive and a method of producing the same.

A hard disk drive (HDD) is available as external storage for a computer system and constructed to drive a magnetic recording medium in the form of a disk at speeds as high as 3,000 r.p.m. to 3,600 r.p.m. To record or reproduce data from a disk, the HDD maintains a magnetic head thereof slightly spaced apart from the disk, e.g., by 0.3 μm due to such a high rotation speed of the disk. More specifically, the head does not contact the disk while the disk is in rotation and contacts the disk when the latter is halted. When moving into and out of contact with the disk repetitively, the head is apt to scratch or otherwise damage the disk due to the structure particular thereto. Moreover, recording and reproducing operations of the conventional head suffer from substantial losses also ascribable to the particular structure of the head, degrading the characteristics of the head.

SUMMARY OF THE INVENTION

It is therefore an object of the present invention to provide a structure of a high performance and reliable magnetic head for an HDD, and a method of producing such a magnetic head.

It is another object of the present invention to provide a generally improved structure of a magnetic head and a method of producing the same.

In accordance with the present invention, a method of producing a magnetic head which records or reproduces data from a magnetic recording medium comprises the steps of preparing a pair of first slider blocks made of a nonmagnetic material, forming a resist film on the bonding surface of either one of the first slider blocks except for a particular portion of the bonding surface where a first core is to be formed and core. The method further includes the steps of forming a recess in the particular portion of the bonding surface to a depth corresponding to the thickness of the first core, forming a metallic magnetic film on the resist film and recess for constituting the first core, peeling off the resist film for removing the unnecessary portion of the magnetic film which lies on the resist film, whereby the particular portion and the other portion of the bonding surface are flush with each other, and bonding the other first slider block to the one first slider block formed with the first core while holding the bonding surface of the other first slider block in abutment against the bonding surface of the one first slider, for thereby forming a first core block wherein the first core is partly exposed on one end of the first core block. The invention also includes the steps of a pair of second slider blocks made of a nonmagnetic material, forming a metallic magnetic film which has the same thickness as the first core and constitutes a second core on the bonding surface of either one of the second slider blocks, bonding the other second slider block to the one second slider block formed with the second core while holding the bonding surface of the other second slider block in abutment against the bonding surface of the one second slider block, thereby forming a second core block. Additionally, the inventive method includes bonding the second core block to the one end of the first core block with the intermediary of a gap spacer while aligning the first and second cores to each other.

Also, in accordance with the present invention, a method of producing a magnetic head which records or reproduces data from a magnetic recording medium comprises the steps of preparing a pair of slider blocks made of a nonmagnetic material, setting a particular portion for forming a core on the bonding surface of either one of the slider blocks, and forming a metallic magnetic film for constituting the core in the particular portion. The inventive method also includes a nonmagnetic film on the metallic magnetic film and the other portion of the bonding surface, the nonmagnetic film being thicker than the metallic magnetic film for constituting the core, flattening the bonding surface, bonding the other slider block to the one slider block while holding the bonding surface of the other slider block in abutment against the flattened bonding surface of the one first slider block, and bisecting the bonded slider blocks in a direction perpendicular to the bonding surfaces, whereby a first and a second core block having a first and a second core, respectively, are produced. The invention method also includes forming a recess for winding a coil in the second core block, and bonding the first and second core blocks at the bisected surfaces thereof via a gap spacer while aligning the first and second cores to each other.

Further, in accordance with the present invention, a method of producing a magnetic head which records or reproduces data from a magnetic recording medium comprises the steps of preparing a pair of slider blocks made of a nonmagnetic material, setting a particular portion for forming a core of predetermined thickness on the bonding surface of either one of the slider blocks, and forming a metallic magnetic film of predetermined thickness for constituting the core in the particular portion and the other portion of the bonding surface. The inventive method also includes flattening the bonding surface, bonding the other slider block to the one slider block while holding the bonding surface of the other slider block in abutment against the flattened bonding surface of the one first slider block and bisecting the bonded slider blocks in a direction perpendicular to the bonding surfaces, whereby a first and a second core block having a first and a second core, respectively, are produced. The method further includes forming a recess for winding a coil in the second core block, and bonding the first and second core blocks at the bisected surfaces thereof via a gap spacer while aligning the first and second cores to each other.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
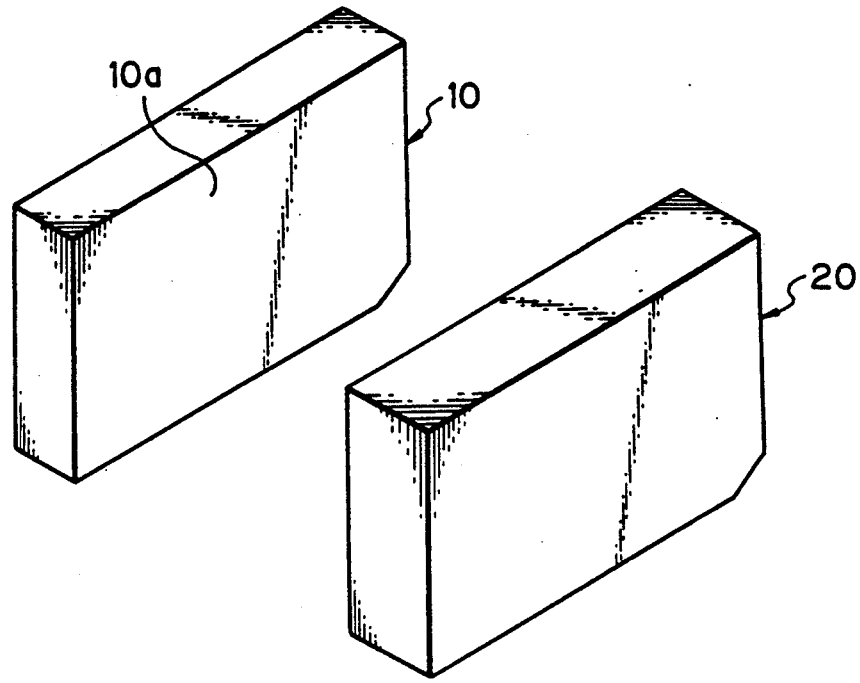
FIGS. 1 through 7 are views showing a specific sequence of steps for producing a conventional magnetic head.
Figure 2:
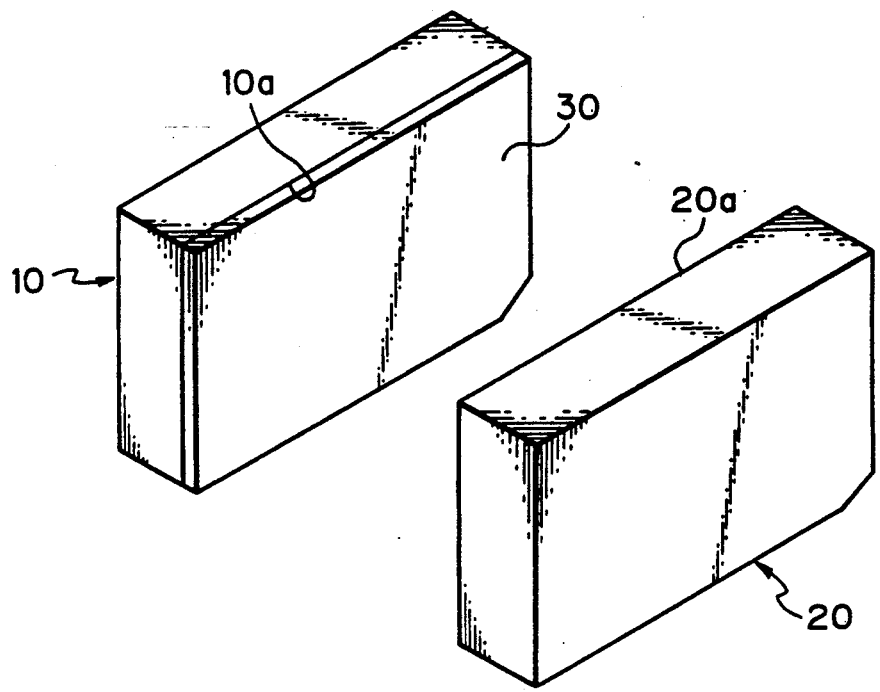
Figure 3:
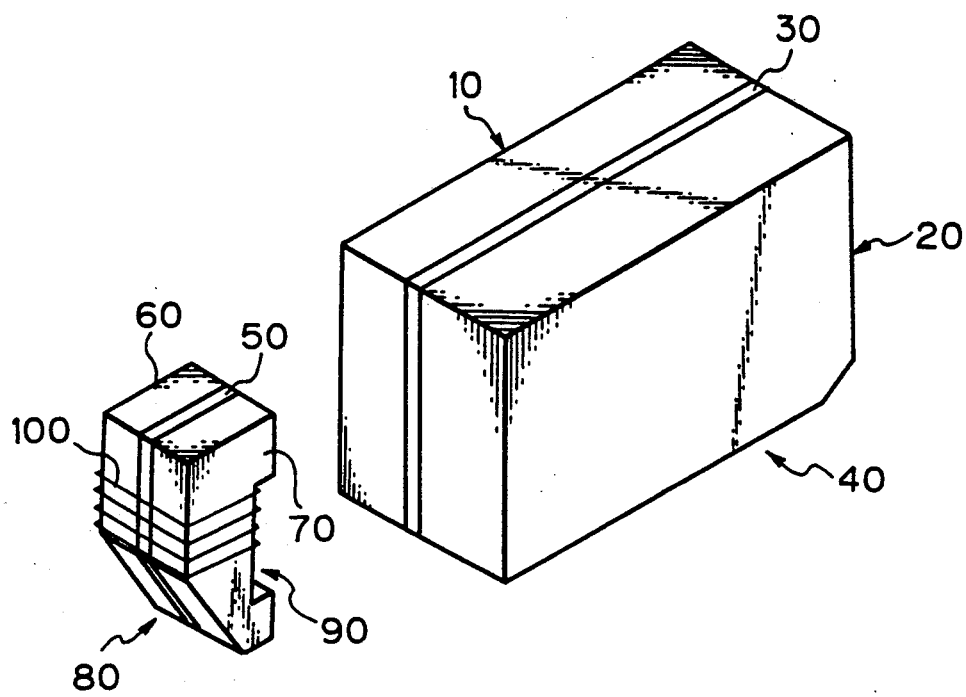
Figure 4:
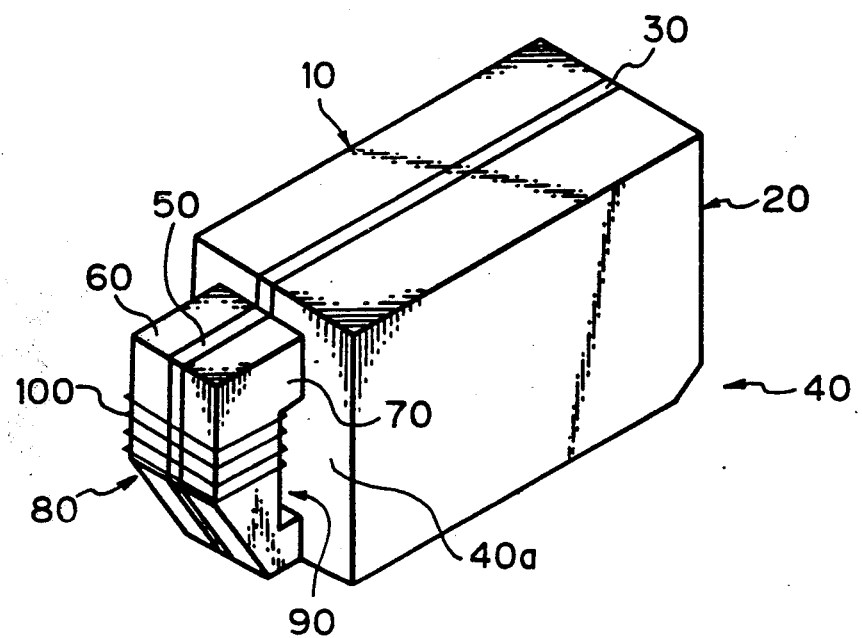
Figure 5:
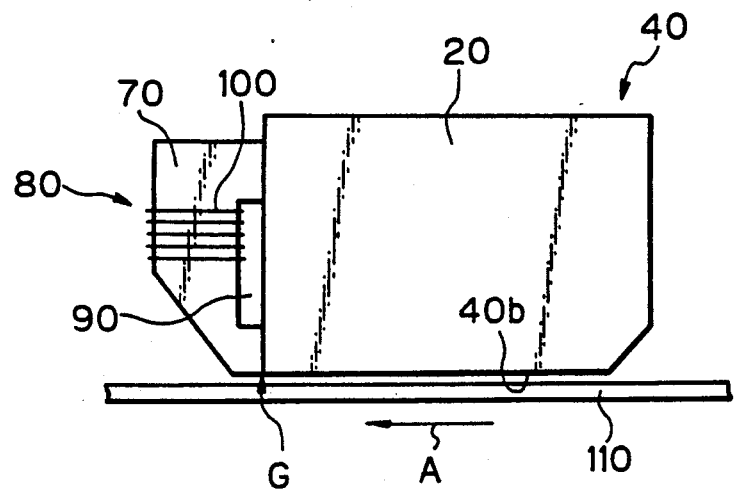

To better understand the present invention, a brief reference will be made to the structure of a conventional magnetic head and a method of producing it, shown in FIG. 1. As shown, a pair of slider blocks 10 and 20 are prepared, and each is made of a suitable nonmagnetic material such as alumina titanium carbide or similar ceramic. As shown in FIG. 2, sendust or similar metallic magnetic material is deposited on the entire bonding surface 10a of one slider block 10 by sputtering or similar technology, forming a film 30 having a predetermined thickness. The magnetic film 30 plays the role of a first core. The thickness of the magnetic film or first core 30 defines the track width of a magnetic gap G, FIG. 5, which will be described. Then, as shown in FIG. 4, the slider blocks 10 and 20 have their facing surfaces 10a and 20a abutted against each other with the intermediary of the magnetic film 30 and then bonded together by glass deposition, constituting a first core block 40 in combination. A second core block 80 is configured in the form of a letter C and, like the first core block 40, comprises a second core 50 and a pair of slider blocks 60 and 70 holding the core 50 therebetween. A wire is wound around the second core block 80 by a predetermined number of turns by using a recess 90 formed in the intermediate portion of the core block 80, forming a coil 100. Finally, the second core block 80 is bonded to one end 40a of the first core block 40 with the intermediary of a thin film of $SiO_2$ or similar nonmagnetic material, not shown, by glass deposition or similar technology. The nonmagnetic thin film serves as a gap spacer. At this instant, the first and second cores 30 and 50 are, of course, accurately aligned with each other. As FIG. 5 indicates, the first core block 40 of the so fabricated magnetic head faces a magnetic recording medium 110 at the underside 40b thereof while being lifted away from the medium 110. Although not shown in the figure, this surface 40b of the core block 40 is formed with elongate grooves for lifting the head and lands for allowing the medium 110 to slide thereon. The medium 110 moves from the core block 40 side to the core block 80 side, as indicated by an arrow A in FIG. 5. Data is recorded or reproduced from the medium 110 at a magnetic gap G formed between the first and second cores 30 and 50.

The problem with the above-described conventional head is that the metallic magnetic film 30 covering the entire surface 10a of the slider block 10 of the first core block 40 aggravates the loss while data is written to or read out of the medium 110 at the magnetic gap G, thereby degrading the characteristics of the head.

Figure 6:
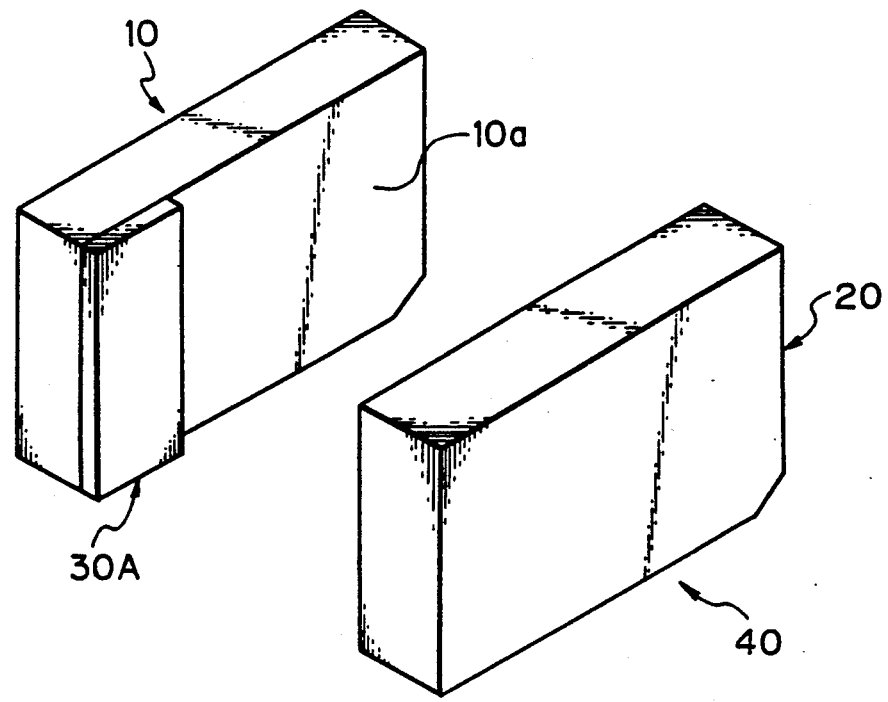
Figure 7:
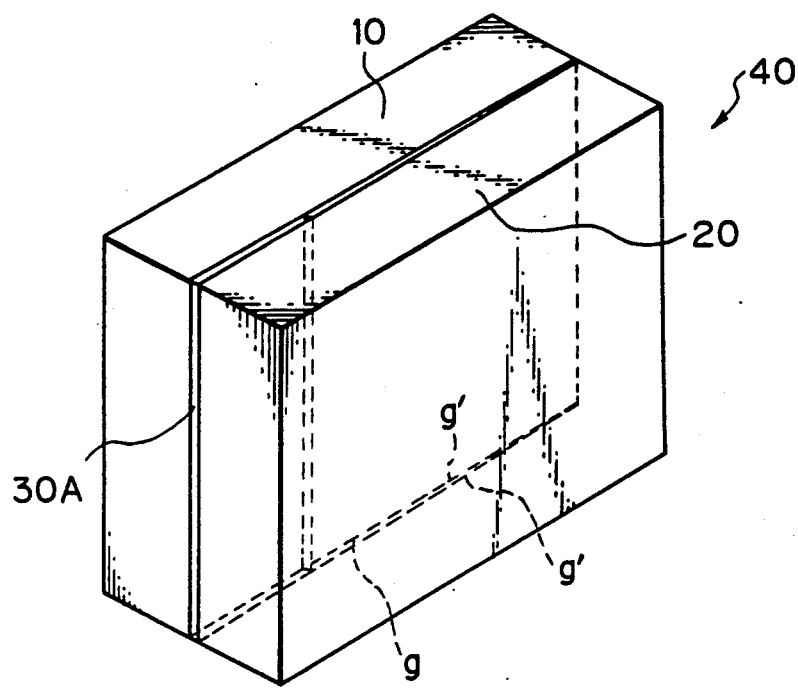
Figure 8:
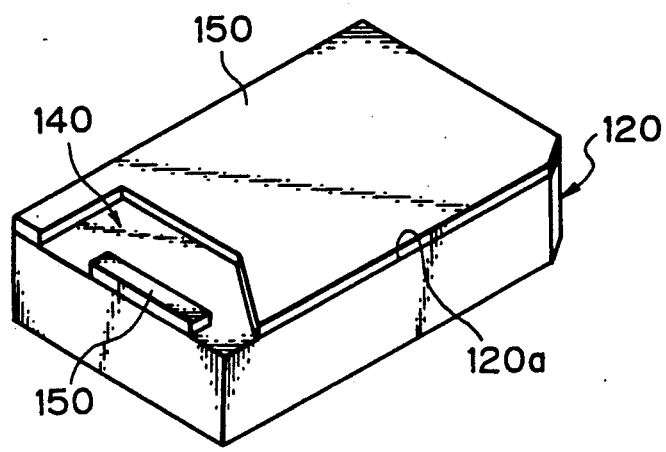
FIGS. 8 through 14 are perspective views showing a procedure for producing a magnetic head embodying the present invention.

In light of the above, as shown in FIG. 6, a first core 30A smaller than the first core 30 may be formed on only part of the surface 10a of the slider block 10 which adjoins the previously mentioned one end 40a of the core block 40. This, however, brings about another problem, as follows. As shown in FIG. 7, when the slider block 10 with such a first core 30A and the other slider block 20 are bonded together at their surfaces 10a and 20a, a gap g is produced on the underside 40b of the core block 40 that faces the medium 110 due to the step ascribable to the thickness of the first core 30A. Generally, a magnetic head included in an HDD and a magnetic recording medium are spaced apart from each other while the medium is in rotation, but they are held in contact while the medium is at rest. Under usual operating conditions, therefore, the head is repetitively caused to go into and out of contact with the medium. It follows that the above-mentioned slider blocks 10 and 20 forming gap g are apt to scratch or otherwise damage the medium 110 with the edges g' thereof.

Figure 9:
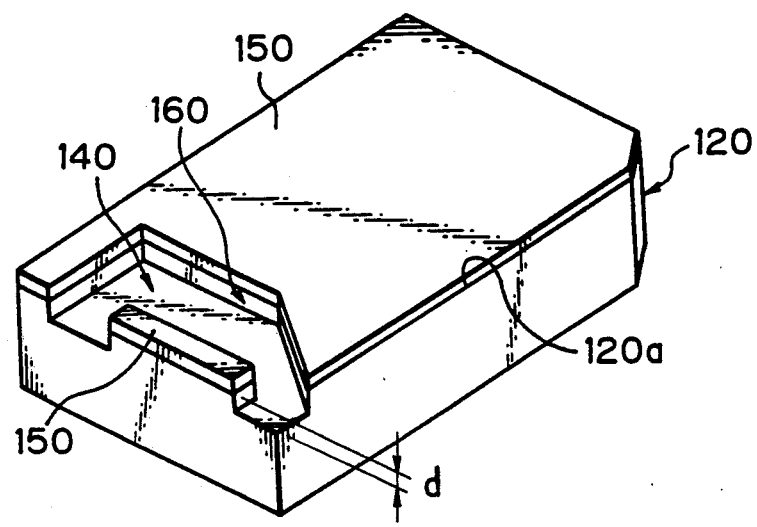
Figure 10:
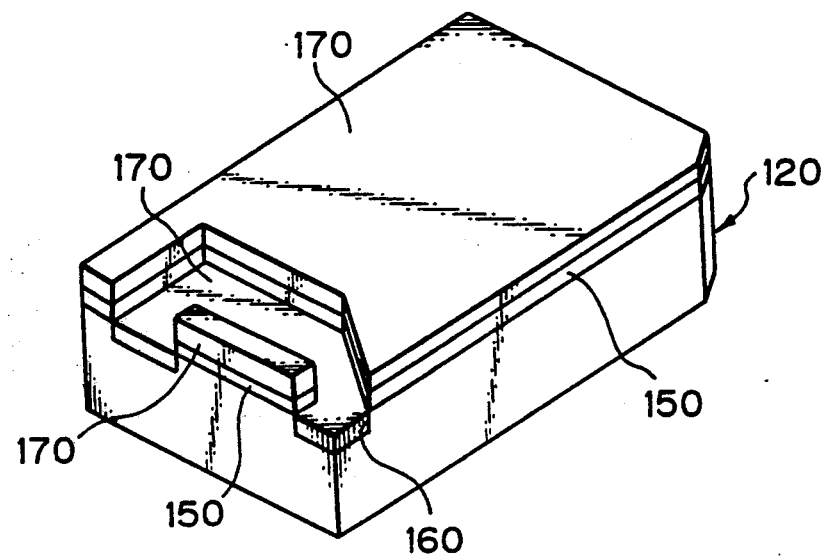
Figure 11:
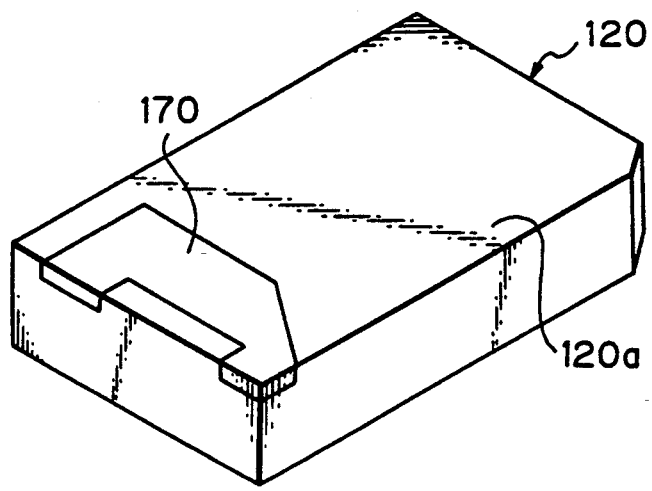

Referring to FIGS. 8 through 14, an embodiment of the magnetic head in accordance with the present invention and a procedure for fabricating it will be described. As shown, a pair of slider blocks 120 and 130 are prepared each of which is made of a nonmagnetic material such as alumina titanium carbide or similar ceramic. As FIG. 8 indicates, a resist film 150 is formed on the bonding surface 120a of one slider block 120 by photolithography, except for a portion 140 thereof where a first core is to be formed. Subsequently, as shown in FIG. 9, the above-mentioned portion 140 of the slider block 120 is etched by dry or wet etching to form a corresponding recess 160. The depth d of the recess 160 is selected to be equal to the thickness of a first core to be formed. Then, as shown in FIG. 10, cendust or similar metallic magnetic material is sputtered or otherwise deposited on the entire resist film 150 and recess 160 of the slider block 120, thereby forming a magnetic film 170. This film 170 has the same thickness as the core to be formed, i.e., the depth d of the recess 160. Only the part of the magnetic film 170 formed in the recess 160 constitutes a first core. Finally, as shown in FIG. 11, the resist film 150 and, therefore, the unnecessary part of the magnetic film 170 lying thereon is removed by, for example, an organic solvent. On the resulted surface 120a of the slider block 120, the portion where the first core 170 is formed and the other portion are flush with each other.

Figure 12:
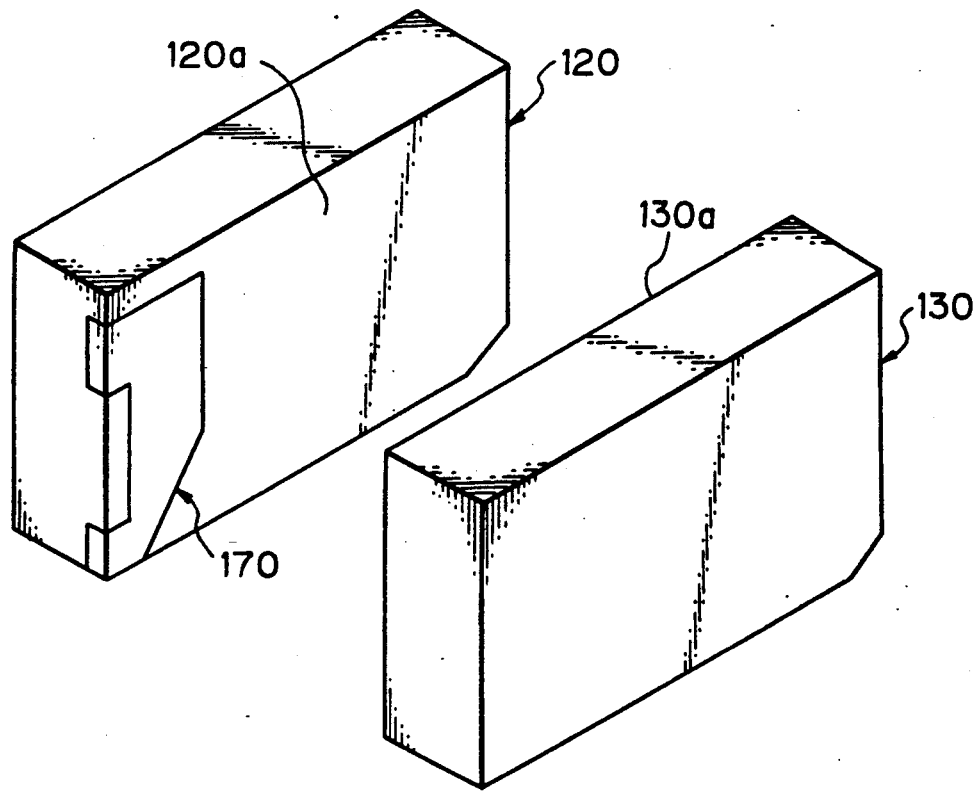
Figure 13:
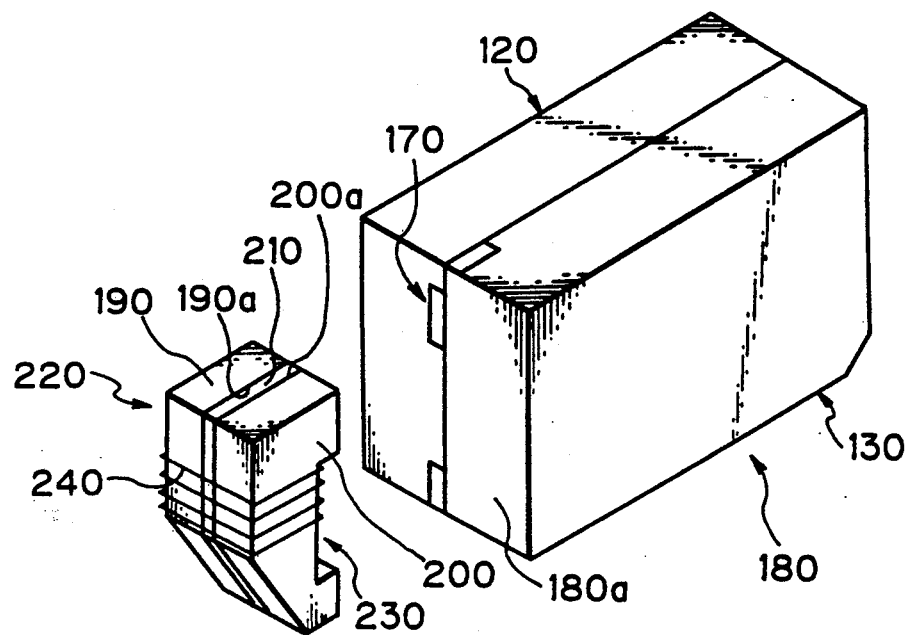

After the slider block 120 has been produced by the above procedure, the slider block 120 and another slider block 130, FIG. 12, are abutted against each other at their bonding surfaces 120a and 130a. Then, the slider blocks 120 and 130 are bonded together by glass deposition or similar technology to complete a first core block 180. In this instance, it is noteworthy that the gap g, FIG. 7, is not produced between the facing surfaces 120a and 130 of the slider blocks 120 and 130 since the surface 120a is flat, as stated earlier.

Subsequently, a generally C-shaped second core block 220 is produced. Specifically, a pair of nonmagnetic slider blocks 190 and 220 implemented by alumina titanium carbide or similar ceramic are prepared. Sendust or similar metallic magnetic material is sputtered or otherwise deposited on the surface 190a of one slider block 190 to the same thickness as the first core 170, thereby forming a second core 210. The slider 190 with the second core 210 and the slider 200 are bonded together with their surfaces 190a and 200a thereof abutting against each other with the intermediary of the second core 210. A wire is wound around the second core block 220 by a predetermined number of turns by use of a recess 230 which is formed in the intermediate portion of the block 220, whereby a coil 240 is formed.

Figure 14:
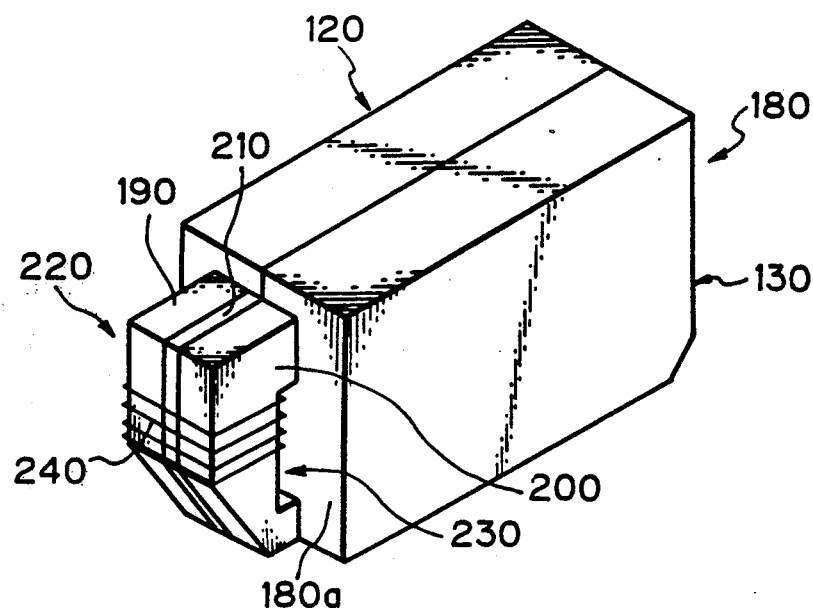

As shown in FIG. 14, in the first core block 180, part of the first core 170 is exposed to the outside on one end 180a of the first core block 180. The second core block 220 is bonded to the above-mentioned end 180a of the first core block 180 by, for example, glass deposition with the intermediary of a thin film of $SiO_2$ or similar nonmagnetic material, not shown. Of course, the first and second cores 170 and 120 are aligned with each other in the event of the bonding operation.

While the illustrative embodiment provides the first and second cores 170 and 210 with an identical configuration, the cores 170 and 210 each may be provided with a different configuration. In the above embodiment, a single first core 70 is formed on one slider block 120. Alternatively, a plurality of first cores 170 may be formed on the slider block 120 in a predetermined positional relation, in which case the slider block 120 will be cut in a predetermined size.

As stated above, in this embodiment, the first core 170 is formed only in part of the bonding surface 120a of the slider block 120 which is adjacent to the end 180a of the first core block 180. Hence, the loss particular to the recording and reproduction of data at the magnetic gap G defined between the cores 170 and 210 is reduced, so that the characteristics of the head are prevented from being degraded. Further, since the first core 170 is buried in the recess 160 formed in the particular portion 140 of the slider block 120 beforehand, the surface 120a of the slider block 120 is flat and does not produce the gap g when combined with the other slider block 130. Such a magnetic head is prevented from scratching a recording medium, insuring high quality and reliable data recording and reproduction.

Figure 15:
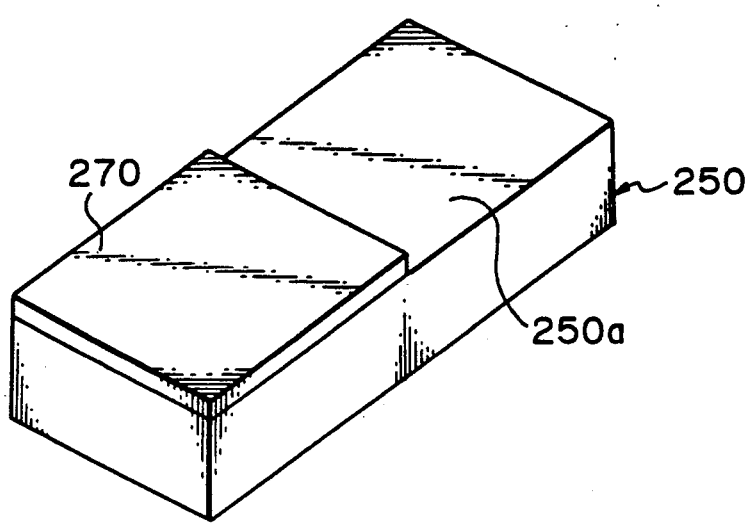
FIGS. 15 through 21 are perspective views showing an alternative embodiment of the present invention.
Figure 16:
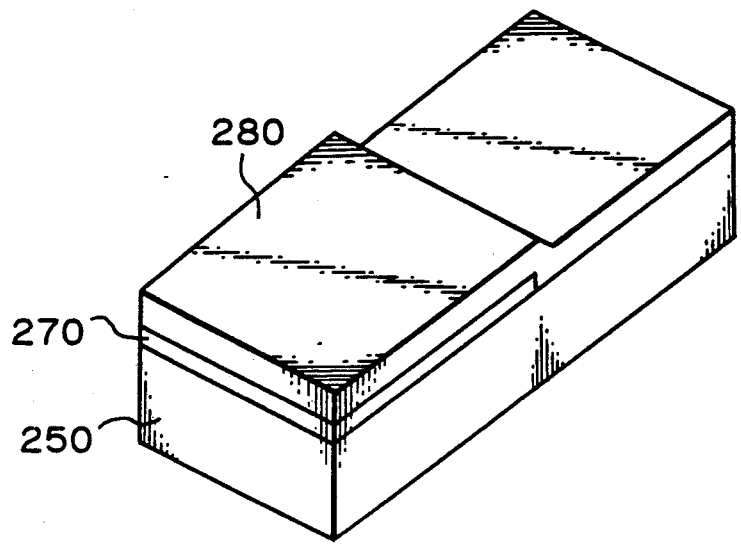
Figure 17:
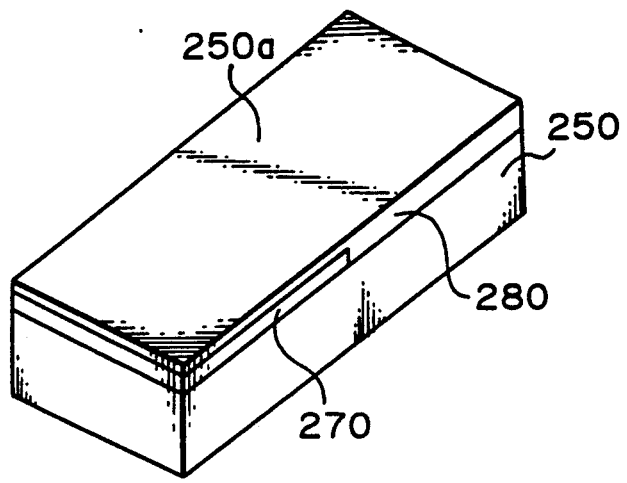

Referring to FIGS. 15 through 21, an alternative embodiment of the present invention will be described. As shown, a pair of slider blocks 250 and 260 similar to the slider blocks of the previous embodiment are produced by use of alumina titanium carbide or similar ceramic. As FIG. 15 depicts, a metallic magnetic film 270 of sendust, for example, is formed on the bonding surface 250a of one slider block 250. The magnetic film 270 has the same thickness as a core to be formed, i.e., a thickness equal to a track width. Then, as shown in FIG. 16, $Al_2O_3$ or similar nonmagnetic material is sputtered or otherwise deposited on the film 270 and the exposed part of the surface 250a to form a nonmagnetic film 280. To facilitate the process step which follows, the nonmagnetic film 280 has a sufficiently greater thickness than the magnetic film 270. Subsequently, as shown in FIG. 17, the bonding surface 250a of the slider block 250 is flattened by etching, polishing or similar technology.

Figure 18:
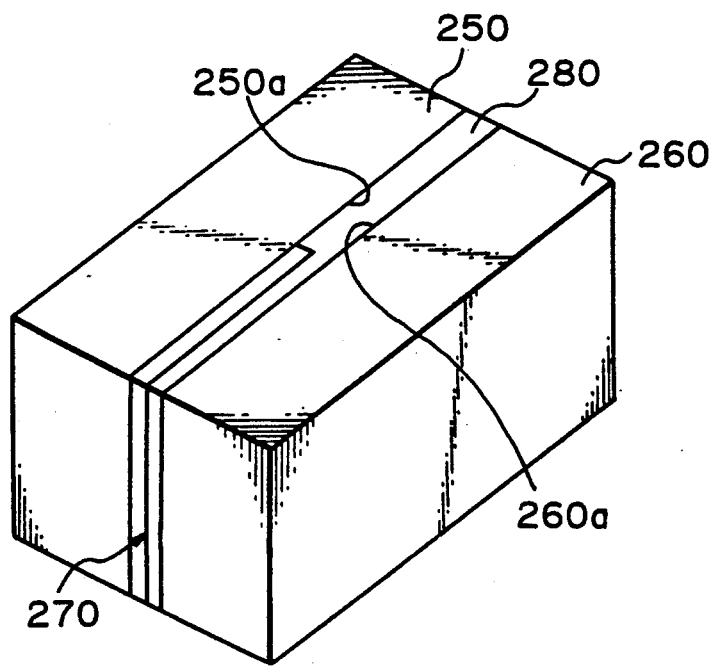

As shown in FIG. 18, the slider block 250 with the magnetic film 270 and the other slider block 260 are bonded together by, for example, glass deposition with their surfaces 250a and 260a abutting against each other. Again, the gap g, FIG. 7, is nt produced between the surfaces 250a and 260a of the slider blocks 250 and 250 since the surface 250a of the slider block 250 is flat.

Figure 19:
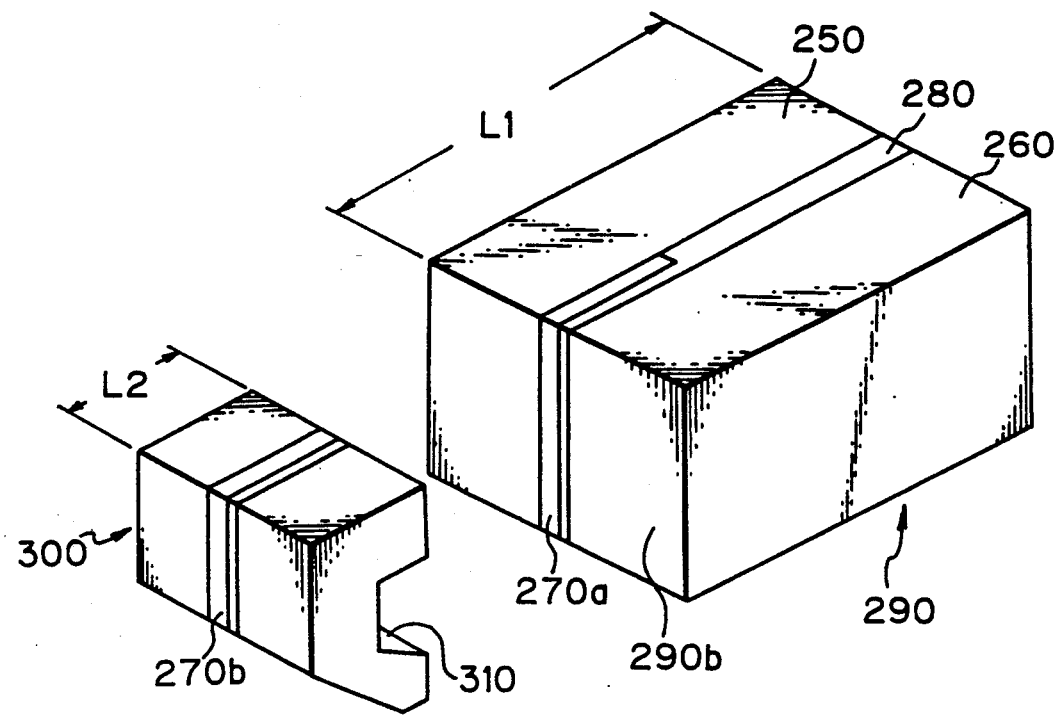

Subsequently, as shown in FIG. 19, a first core block 290 and a second core block 300 having predetermined widths L1 and L2, respectively, are cut off from the bonded blocks 250 and 260. Then, the second core block 300 is cut in the form of a letter C to form a recess 310 for winding a coil. In this condition, part 270a of the magnetic film 270 existing in the first core block 290 and part 270b of the same existing in the second core block 300 constitute a first and a second core, respectively.

Figure 20:
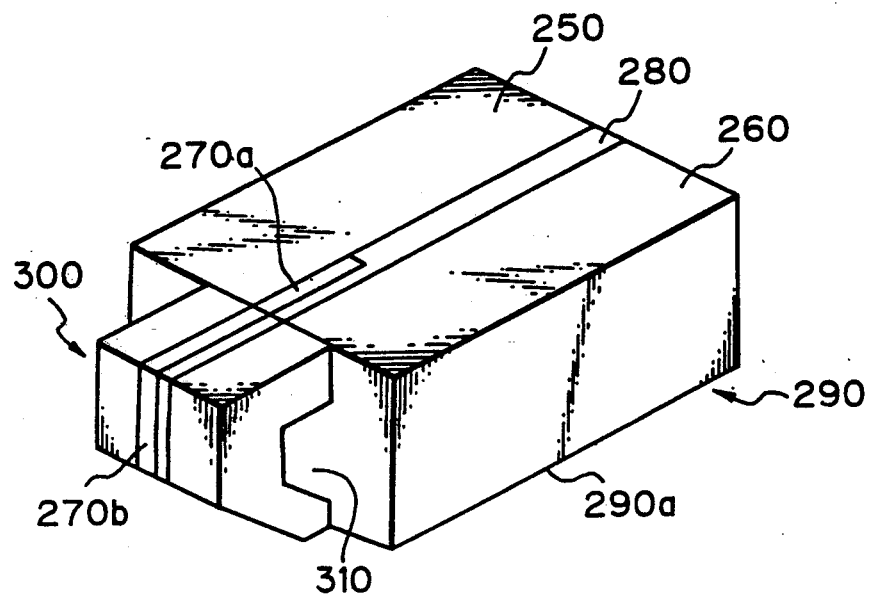

As shown in FIG. 20, the above-stated first and second core blocks 290 and 300 are bonded by glass deposition or similar technology with the intermediary of a gap spacer, i.e., a thin film of $SiO_2$ or similar nonmagnetic material, not shown. At this instance, the first and second cores 270a and 270 are, of course, accurately aligned with each other.

Figure 21:
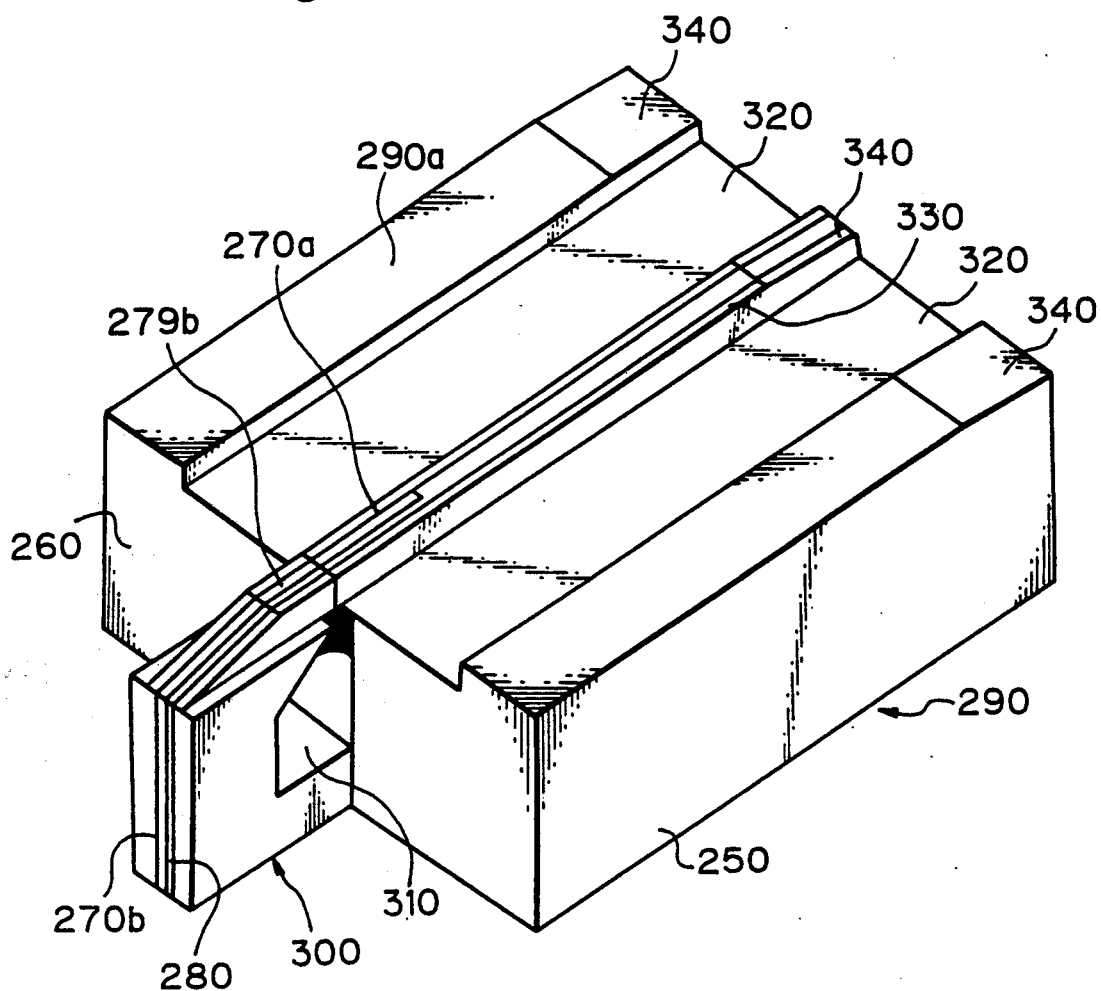

Finally, as shown in FIG. 21, recesses 320 are formed in the surface 290 of the first core block 290 that will face a magnetic recording medium, such that the recesses 320 extend in a direction in which air will be introduced. The recesses 320 in turn define a center track 330 and lands, i.e., sliding surfaces 340.

As stated above, in the illustrative embodiment, the first core 270a is also formed only in part of the bonding surface 250a of the slider block 250 which is adjacent to the end 290b, FIG. 19, of the first core block 290. Hence, the loss particular to the recording and reproduction of data at the magnetic gap G defined between the cores 270a and 270b is reduced, so that the characteristics of the head are prevented from being degraded. Since the surface 250a of the slider block 250 is flat due to the nonmagnetic film 280, the gap g is not formed when the slider block 250 is bonded to the other slider block 260. It follows that this embodiment, like the previous embodiment, frees a recording medium from scratches otherwise caused by the edges if the gap g.

Figure 22:
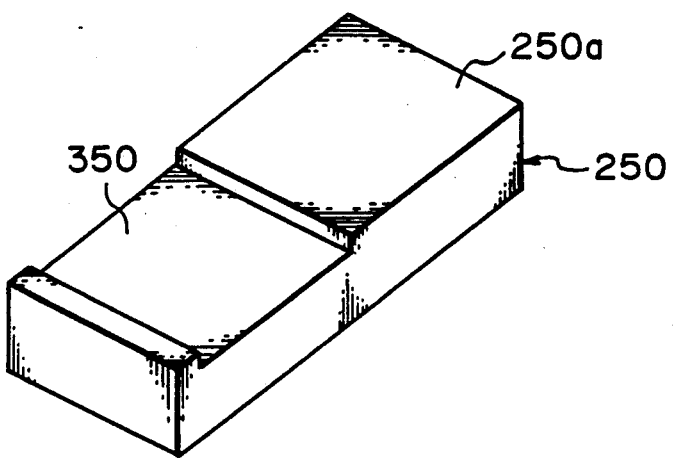
FIGS. 22 through 24 are perspective views showing another alternative embodiment of the present invention.
Figure 23:
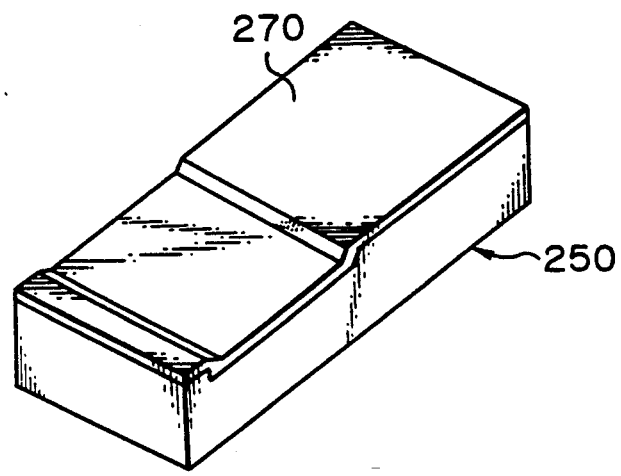
Figure 24:
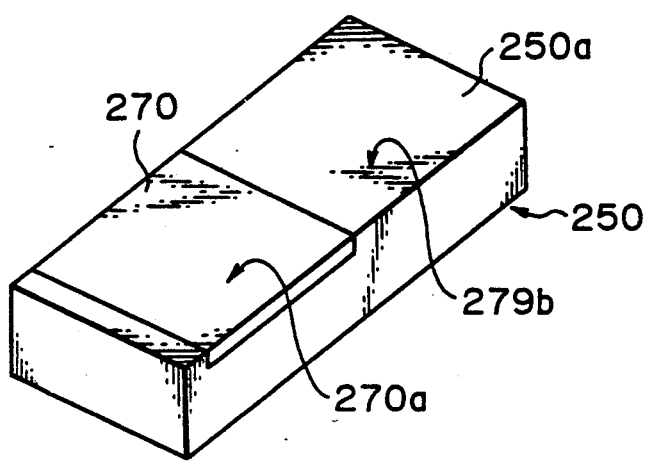

Referring to FIGS. 22 through 24, another alternative embodiment of the present invention is shown. In these figures, the same components or structural parts as those of the embodiment shown in FIGS. 15 through 21 are designated by like reference numerals, and redundant description will be avoided for simplicity. To begin with, the cooperative nonmagnetic slider blocks 250 and 260 are produced by use of alumina titanium carbide or similar ceramic. As shown in FIG. 22, a recess 350 for burying a core is formed in the surface 250a of one slider block 250 by a dicing saw. The depth of the recess 350 corresponds to the thickness of the core to be formed. Then, as shown in FIG. 23, a metallic magnetic film 270 is formed on the surface 250a of the slider block 250 to a thickness corresponding to the thickness of the core. Thereafter, the surface of the resulted laminate is polished or otherwise flattened until the part of the surface 250a where the magnetic film 270 exists and the other portion become flush with each other. This is followed by the same sequence of steps as shown in FIGS. 18 through 21.

As stated above, this embodiment is also free from the gap g despite that the slider blocks 250 and 260 are joined together with their surfaces 250a and 260a butting against each other. The magnetic head, therefore, is prevented from scratching or otherwise damaging a magnetic recording medium.

Various modifications will become possible for those skilled in the art after receiving the teachings of the present disclosure without departing from the scope thereof.

What is claimed is:

1. A method of producing a magnetic head which records or reproduces data from a magnetic recording medium, said method comprising the steps of:
   (a) preparing first and second slider blocks made of a nonmagnetic material;
   (b) forming a first recess for accepting a core of predetermined thickness in a first surface of said first slider block;
   (c) forming a metallic, magnetic film of predetermined thickness in said first recess and the remaining portion of said first surface of said first slider block;
   (d) flattening said metallic, magnetic film to form a flat bonding surface on said first slider block;
   (e) bonding the second slider block to said first slider block while holding a bonding surface of said second slider block in abutment against said flattened bonding surface of said first slider block;

(f) bisecting said bonded slider blocks in a direction perpendicular to said bonding surfaces, whereby a first and a second core block having a first and a second core, respectively, are produced;

(g) forming a second recess for winding a coil in said second core block; and (h) bonding said first and second core blocks at the bisected surfaces thereof via a gap spacer while aligning said first and second cores to each other.

2. A method as claimed in claim 1, wherein the flattening in step (d) comprises removing said metallic magnetic film except for a portion thereof which is provided in said first recess.

3. A method as claimed in claim 1, wherein the bonding in step (e) comprises glass deposition.

4. A method as claimed in claim 1, wherein the bisection in step (f) comprises cutting said slider blocks.

5. A method as claimed in claim 1, wherein the bonding in step (h) comprises glass deposition.

* * * * *